(12) United States Patent
Liang et al.

(10) Patent No.: US 10,931,023 B2
(45) Date of Patent: Feb. 23, 2021

(54) MIMO COUPLER ARRAY WITH HIGH DEGREES OF FREEDOM

(71) Applicants: Ping Liang, Newport Coast, CA (US); Dengkui Zhu, Beijing (CN)

(72) Inventors: Ping Liang, Newport Coast, CA (US); Dengkui Zhu, Beijing (CN)

(73) Assignee: RF DSP Inc., Irvine, CA (US)

( * ) Notice: Subject to any disclaimer, the term of this patent is extended or adjusted under 35 U.S.C. 154(b) by 53 days.

(21) Appl. No.: 16/091,987

(22) PCT Filed: Jul. 14, 2017

(86) PCT No.: PCT/US2017/042135
§ 371 (c)(1),
(2) Date: Oct. 7, 2018

(87) PCT Pub. No.: WO2018/013922
PCT Pub. Date: Jan. 18, 2018

(65) Prior Publication Data
US 2019/0115667 A1     Apr. 18, 2019

Related U.S. Application Data

(60) Provisional application No. 62/362,595, filed on Jul. 15, 2016.

(51) Int. Cl.
*H01Q 15/18* (2006.01)
*H01Q 1/24* (2006.01)
*H01Q 1/52* (2006.01)
*H04B 7/0413* (2017.01)
*H04B 7/10* (2017.01)
*H01Q 21/26* (2006.01)
*H01Q 21/24* (2006.01)
*H04B 17/391* (2015.01)

(52) U.S. Cl.
CPC ............ *H01Q 15/18* (2013.01); *H01Q 1/246* (2013.01); *H01Q 1/523* (2013.01); *H01Q 21/24* (2013.01); *H01Q 21/26* (2013.01); *H04B 7/0413* (2013.01); *H04B 7/10* (2013.01); *H04B 17/391* (2015.01)

(58) Field of Classification Search
CPC .......... H01Q 1/52; H01Q 1/523; H01Q 1/246; H01Q 15/18; H01Q 21/24
See application file for complete search history.

(56) References Cited

U.S. PATENT DOCUMENTS

2008/0291818 A1* 11/2008 Leisten .................. H01Q 11/08
370/208

* cited by examiner

*Primary Examiner* — Hoang V Nguyen
(74) *Attorney, Agent, or Firm* — Guosheng Wang; United States Research and Patent Firm

(57) ABSTRACT

This invention presents embodiments of a coupler array to couple the RF signals between the antenna array of a MIMO base station and a MIMO RF channel emulator. The embodiments enable testing of a large scale MIMO wireless communication system without the need of connecting a large number of RF cables to the antenna ports of the MIMO base station.

5 Claims, 2 Drawing Sheets

MIMO COUPLER ARRAY WITH HIGH DEGREES OF FREEDOM

This application claims the benefit of U.S. Provisional Application No. 62/362,595, filed on Jul. 15, 2016.

FIELD OF INVENTION

This invention relates to a radio frequency (RF) coupler array for testing a large-scale Multi-User Multiple-Input Multiple-Output (MU-MIMO) wireless communication system.

BACKGROUND

To meet the continued fast growing demand of mobile data, the wireless industry needs solutions that can achieve high order of spatial re-use of limited spectral resources. One method for increasing spatial re-use of wireless spectrum is MIMO, especially large scale Multi-User MIMO (MU-MIMO), often referred to as massive MIMO. In a wireless communication system, a wireless node with multiple antennas, a Base Station (BS) or a User Equipment (UE), can use beamforming in downlink (DL) or uplink (UL) to increase the Signal-to-Noise Ratio (SNR) or Signal-to-Interference-plus-Noise Ratio (SINR), hence the data rate, of the links with other wireless nodes. A BS with MU-MIMO can beamform to multiple UEs simultaneously in a frequency and time block, e.g., a Resource Block (RB), i.e., using spatial multiplexing to provide capacity growth without the need of increasing the bandwidth. In a large-scale MIMO or massive MIMO system, a BS may be equipped with many tens to hundreds or even thousands of transmit (Tx) chains and receive (Rx) chains and simultaneously beamform to tens of UEs using the same RB. Let the number of BS Tx and Rx chains be M and the number of simultaneously served UEs on the RB be K. There is a need of a hardware RF channel emulator capable of emulate in real-time MxK RF channels. In a TDD system, it is desired that such an emulator maintain the reciprocity of the channel between the BS and UEs so that the BS can estimate the DL OTA channel using UL signaling. This allows the channel estimation in a massive MIMO system to scale with K rather than M, thus significantly reduces the overhead of channel estimation in a massive MIMO system. Furthermore, the antennas in a massive MIMO system may be integrated with the RF circuits and there are no antenna ports for using cables to connect the BS RF paths to the channel emulator. Even if the BS has antenna port connectors, it will be a hassle to connect many tens or even more RF ports using cables. In our previous provisional patent application 62/296,614 "Massive MIMO Channel Emulator" filed on Feb. 18, 2016, we presented embodiments that place the antenna array of the BS, the antenna array of the RF channel emulator and the reflectors and/or diffusers placed between them for creating multipath inside a RF chamber that isolates the equipment and channels from the outside environment. The goal was to create an over-the-air (OTA) channel matrix G between the M Tx/Rx paths/antennas on the BS and the N Tx/Rx paths/antennas of the channel emulator that is rank M and nearly time-invariant or has a sufficiently long coherence time. In our related provisional patent application 62/327,753 "Over-the-Air Channel State Information Acquirement For A Massive MIMO Channel Emulator With Over-The-Air Connection" filed on Apr. 26, 2016, we presented embodiments for estimating of the OTA channel matrix G.

The present invention presents a new apparatus that provides a different means for connecting a MIMO BS to a MIMO RF Channel Emulator without requiring RF port connectors for testing, and does not reduce the rank of the channel matrix for the total channels connecting the massive MIMO BS and UEs.

DETAILED DESCRIPTION

Figure 1:
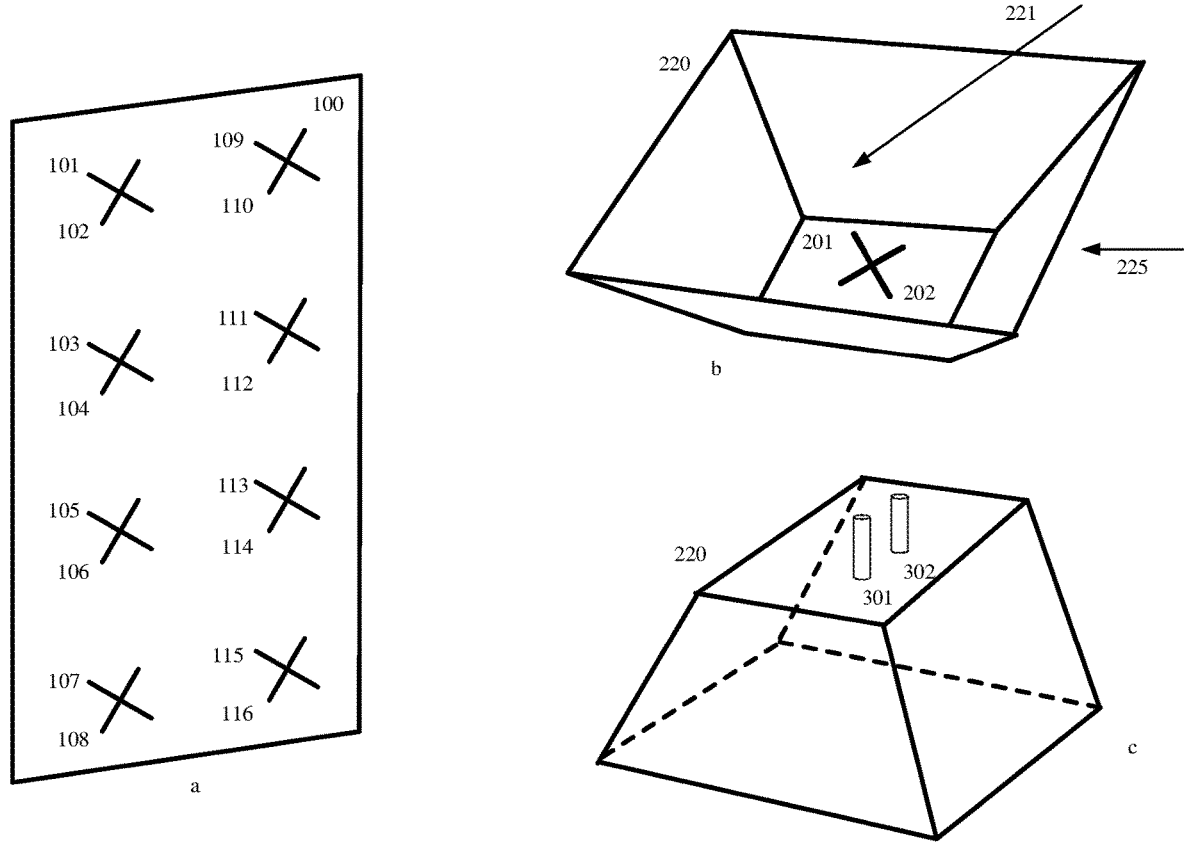
FIG. 1a shows the antenna array at the BS.
FIG. 1b shows a view of the interior of a trapezoidal prism cavity.
FIG. 1c shows a view of the exterior of the same cavity.

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Here after, a pilot signal may mean a signal transmitted by one antenna for the purpose of estimating the channel between the transmitting antenna and one or more receiving antennas. It may also be called a reference signal, a channel estimation signal or a test signal.

In the following descriptions, an antenna is used to indicate a RF circuit path that includes the RF circuits and the antenna unless indicated by the context otherwise, for example, in a hybrid beamforming system, one RF path may be connected to multiple antenna elements via a beamforming circuit, mostly analog. In such a system, all the antenna elements connected to the same RF path can be treated as a single equivalent antenna in baseband processing. The abbreviation RF is used to denote radio frequency or radio signals of any frequency, e.g., ranging from a hundreds of MHz to terahertz.

To overcome the lack of antenna ports for connecting cables or the hassle of connecting a large number of cables, one embodiment uses an array 200 of couplers 220 to couple the RF signals from (or to) the MIMO antenna array 100 of a MIMO BS to (or from) a MIMO RF Channel Emulator (MCE). Each coupler 220 comprises a cavity 221 that confines the energy radiated from (or to) a first antenna, e.g., 101, or a first pair, e.g., 101 and 102, of co-located cross-polarized antennas, in the antenna array of the MIMO BS; and a second antenna, e.g., 201, or a second pair, e.g., 201 and 202, of cross-polarized antennas, which are aligned with the polarization of the first antennas in the antenna array of the MIMO BS and are used to receive signals from (or transmit signals to) antenna(s) that are covered by the cavity 221, or antenna(s) in the BS antenna array 100 that corresponds to the antenna(s) inside the cavity, e.g., 201 and 202. A cavity is constructed using metallic material to increase isolation of the RF signals among the cavities in the array. A cavity can be cubic, rectangular, or trapezoidal prism or other shaped metal box. FIG. 1b shows a view of the interior of a trapezoidal prism cavity and FIG. 1c shows a view of the exterior of the same cavity, as seen from a side view 225 but flipped upside down. The inside of a cavity 221 may be lined with a lossy absorber material that absorbs electromagnetic energy which lowers the Q ratio of stored vs. transmitted energy of the cavity.

Figure 2:
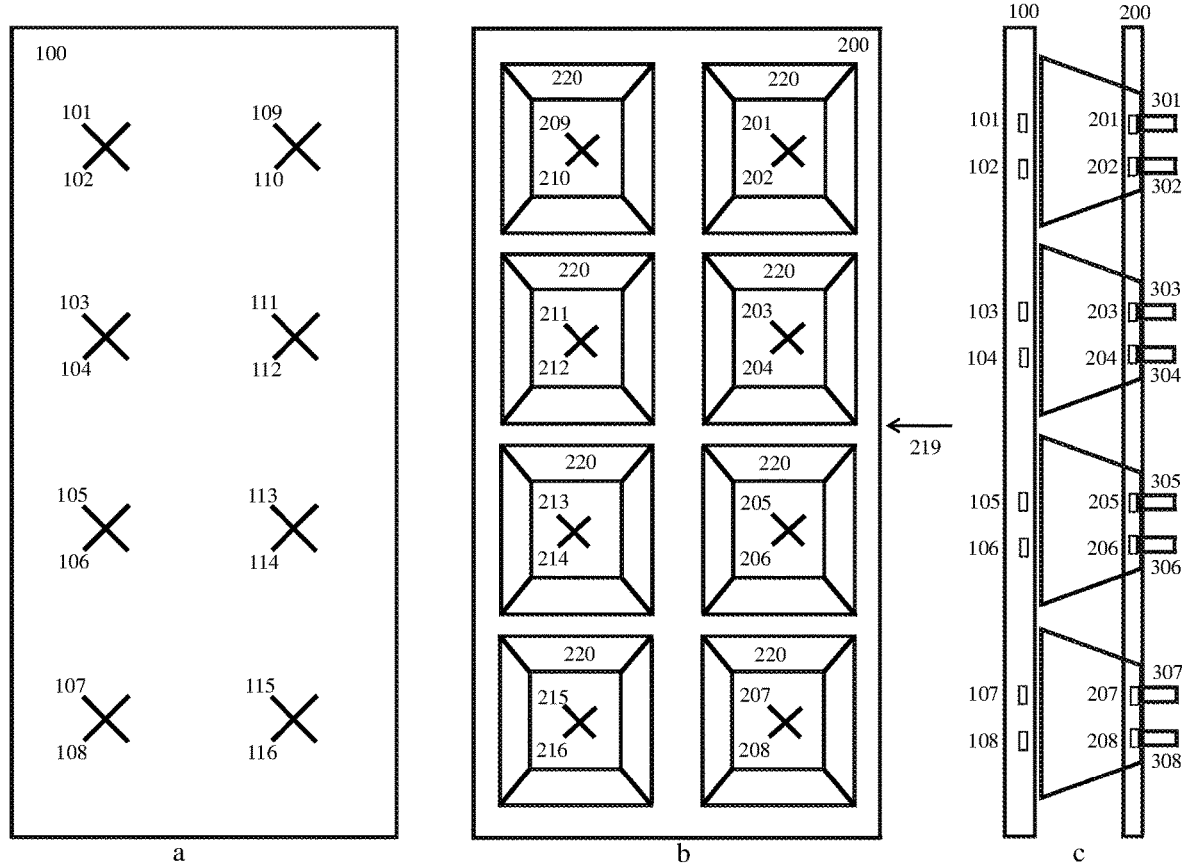
FIG. 2a shows the antenna array at the BS.
FIG. 2b shows the coupler array at the MCE.
FIG. 2c shows the coupling between the BS antenna array and the MCE antenna array through OTA.

For the purpose of illustration, FIGS. 1a, 2a and 2b show, as an example, arrays of 16 cross-polarized antenna elements on the BS antenna array 100 and the coupler array 200. However, the embodiments are in no means limited to this number. In fact, the number of antenna elements can be as large as a few hundreds or thousands on the BS antenna array 100, and the number of couplers on the coupler array 200 can be equal to or more than the number of antennas on the BS antenna array 100 to ensure that the Degree of Freedom (DoF) or the MIMO channel matrix rank is not reduced. Alternatively, when a reduction in the DoF or the MIMO channel matrix rank is acceptable or desired, the number of couplers on the coupler array 200 can be less than the number of antennas on the BS antenna array 100. Furthermore, FIGS. 1 and 2 show cross-polarized antenna elements, but the embodiments are not limited to cross-polarized antenna elements. The embodiments are applicable to arrays of other types of antenna elements as well.

To couple the RF signals from the antennas on the BS antenna array 100, the openings of the couplers on the coupler array 200 are placed in close proximity or contact with the surface of the BS antenna array 100 such that each antenna on the BS antenna array is partially, mostly or completely covered by a cavity 220 as shown in the side view in FIG. 2c, wherein the side view is obtained by looking at the coupler array 200 in FIG. 2b from the side shown by the direction 219. Let the number of antennas on the BS antenna array 100 be M, the number of the antennas on the coupler array 200 be N, and the channel matrix between the BS antenna array 100 and the array of antennas on the coupler array 200 be G.

The objective is to approximate the effect of using RF cables to connect the RF ports on a BS to the RF ports on the MCE. One embodiment comprises using the coupler array to achieve a channel matrix G with rank of min{M, N}, or full rank, and when M=N, rank(G)=M; estimating the channel matrix G; and applying the inverse $G^{-1}$ when M=N, or pseudoinverse $(G^T G)^{-1} G^T$ when M<N so that the equivalent connection matrix between the BS and the MCE approximates a diagonal matrix, similar to connections by RF cables. The estimation of the G matrix and the application of the inverse matrix are also described in our provisional patent applications 62/296,614 "Massive MIMO Channel Emulator" filed on Feb. 18, 2016, and 62/327,753 "Over-the-Air Channel State Information Acquirement for a Massive MIMO Channel Emulator with Over-the-Air Connection" filed on Apr. 26, 2016. Additionally, it is desired that the condition number of G is small so its inverse $G^{-1}$ or pseudoinverse $(G^T G)^{-1} G^T$ can be reliably computed in the presence of error in estimating G.

In one embodiment, each antenna on the BS antenna array is covered by a corresponding cavity, and the polarizations of two corresponding antennas are aligned in case of polarized antennas are used, so that the signal from an antenna in the BS antenna array is favorably coupled to a corresponding antenna in the coupler array 200, i.e., in FIG. 2, 1ij corresponds to 2ij, i=0,1, j=1 . . . , 16, e.g., 101 corresponds to 201, 102 to 202, . . . , 116 to 216. Each of antennas 101 to 116 on the BS antenna array is connected to an antenna port on the Radio Unit (RU) of the BS. Correspondingly, each of antennas 201 to 216 is connected to an antenna port on the RU of the MCE. In one embodiment, each of antenna elements 201 to 216 is connected to the correspondingly numbered connectors 301 to 316, i.e., 2ij is connected to 3ij, i=0,1, j=1, . . . , 16, and an RF cable is used to connect each connector 301 to 316 to a RF port on the MCE. The objective is to increase the Diagonal Dominance in Coupling (DDC), i.e., the signal power from a BS antenna is more favorably coupled to a corresponding RF port on the MCE, and in comparison, the signal power from a BS antenna is less favorably coupled to a non-corresponding port on the MCE. For the example of FIGS. 1 and 2, this means that the coupling between antennas 1ij and 2ij should be significantly stronger than couplings between antenna 1ij and 2mn when mn≠ij for all antennas on the array. The reason for doing so is because such couplings are more likely to lead to a channel matrix G that is diagonal dominant and a strictly diagonal dominant matrix is non-singular, that is, full rank. A matrix is said to be diagonally dominant if for every row of the matrix, the magnitude of the diagonal entry in a row is larger than or equal to the sum of the magnitudes of all the other (non-diagonal) entries in that row. More precisely, the matrix $G \in \mathbb{C}^{M \times M}$ is strict diagonally dominant if $$|g_{ii}| > \Sigma_{j \neq i} |g_{ij}|, \forall i,$$

where $g_{ij}$ denotes the entry of G in the ith row and jth column. Note that diagonally dominant matrix (DDM) also can be equivalently defined in the column dimension. One of the most important properties of a strict DDM is that it is non-singular (det(G)≠0), which is known as the Levy-Desplanques theorem whose proof is given below:

Proof. Let det(G)=0, then it means that there exists a non-zero vector $x=[x_1 \ldots x_M]$ such that Gx=0. Let k be the index such that $|x_k|=\max(|x_1|, \ldots, |x_M|)$, then we have $$g_{k1} x_1 + g_{k2} x_2 + \ldots + g_{kM} x_M = 0,$$

which implies that $$|g_{kk} x_k| = |g_{kk}||x_k| = |\Sigma_{j \neq k} g_{kj} x_j| \leq \Sigma_{j \neq k} |g_{kj}||x_k| \leq |x_k| \Sigma_{j \neq k} |g_{kj}|.$$

Hence, it means $$|g_{kk}| \leq \Sigma_{j \neq k} |g_{kj}|,$$

which contradicts the definition of strict DDM and the theorem is proved. The Levy-Desplanques theorem can also be proved using the Gershgorin Circle Theorem.

Strict DDM is a sufficient condition for a full rank matrix. Increasing DDC increases the likelihood of producing a strict DDM in the channel matrix G. We have shown with experiments and measurement data that even if G is not strict DDM, increasing and adjusting DDC can produce a full rank G matrix with a low condition number.

In one embodiment, configuration parameters of the coupler array 200 including the position, orientation, shape or size of the couplers 220 can be adjusted and/or aligned with antennas on the BS antenna array 100 to achieve a full rank channel matrix G. This embodiment is effective in adaptively coupling with BS antenna arrays that may have a different size, shape, inter-antenna distance, distribution of antenna elements, beam pattern, etc. In another embodiment, one or more configuration parameters of the coupler array 200 are controlled using a microcontroller or a computer, and a user interface is provided to enable a user to adapt the configuration parameters to achieve a desired channel matrix. In yet another embodiment, the adaptation of the configuration parameters of the coupler array 200 to a BS antenna array is automated with a feedback control loop that iteratively searches for a desired configuration to achieve a channel matrix G with the required property including rank and condition number.

It is desired to keep the channel matrix G approximately time-invariant, or approximately time-invariant within a period of time so that the need to re-estimate the channel matrix G is less frequent. In one embodiment, the closely coupled BS antenna array 100 and the coupler array 200 are placed into an RF isolation chamber that shields the electromagnetic fields from the environment outside the chamber. If the BS RU and the BS antenna array 100 are integrated together, and/or if the MCE RU and the coupler array are integrated together, the corresponding RU, and other components that are also integrated with the RU or are required to be attached to the RU, also need to be placed inside the RF chamber. When equipment such as a RU is placed inside a small enclosed space, the heat it generates needs to be dissipated. In one embodiment, metal meshes with mesh size sufficiently smaller than the wavelength the RF signals are used to construct the RF shielding chamber to allow heat dissipation from air ventilation or force air cooling, or air conditioning.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. An apparatus for coupling radio signals from and/or to an antenna array comprising an array of couplers arranged to match the distribution or beam patterns of the antenna array of a Multiple Input Multiple Output (MIMO) Radio Unit (RU),
    wherein each coupler includes one or more coupling antennas that are used to mainly receive a subset of radio signal from and/or transmit a subset of radio signal to the antenna array of the MIMO RU over the air, and
    wherein each coupler reduces or conditions the cross-interference of the subset of radio signal radiated from the antenna array of the MIMO RU to the other coupling antennas in the array of couplers, and reduces or conditions the cross-interference of the subset of radio signal radiated from a coupling antenna in one coupler in the array of couplers to radio signals radiated from coupling antennas in other couplers.

2. The apparatus of claim 1 wherein a coupler contains a pair of coupling antennas that are cross-polarized with polarization aligned with a pair of cross-polarized antennas in the antenna array of the MIMO RU.

3. The apparatus of claim 1 wherein a coupler includes a cavity which houses one or more coupling antennas.

4. The apparatus of claim 3 wherein the cavity of a coupler is lined or filled with an absorbing material that absorbs electromagnetic energy.

5. The apparatus of claim 3 wherein the openings of the cavity of the couplers in the array of couplers are placed in close proximity or in contact with the surface of the MIMO RU antenna array, and an antenna in the MIMO RU antenna array is at least partially covered by the cavity of a coupler.

\* \* \* \* \*